US008937453B2

(12) United States Patent
Wohlschlager

(10) Patent No.: US 8,937,453 B2
(45) Date of Patent: Jan. 20, 2015

(54) SUPPLY UNIT AND A METHOD FOR SUPPLYING AN ELECTRICALLY OPERATED DEVICE

(75) Inventor: Markus Wohlschlager, Sindelfingen (DE)

(73) Assignee: Koninklijke Philips N.V., Eindhoven (NL)

( * ) Notice: Subject to any disclaimer, the term of this patent is extended or adjusted under 35 U.S.C. 154(b) by 390 days.

(21) Appl. No.: 13/377,827

(22) PCT Filed: Jun. 16, 2010

(86) PCT No.: PCT/IB2010/052712
§ 371 (c)(1),
(2), (4) Date: Dec. 13, 2011

(87) PCT Pub. No.: WO2010/150142
PCT Pub. Date: Dec. 29, 2010

(65) Prior Publication Data
US 2012/0091947 A1 Apr. 19, 2012

(30) Foreign Application Priority Data

Jun. 22, 2009 (EP) .................................... 09163343

(51) Int. Cl.
*H02J 7/00* (2006.01)
*G05B 9/02* (2006.01)
*G05B 23/02* (2006.01)

(52) U.S. Cl.
CPC .............. *G05B 9/02* (2013.01); *G05B 23/0291* (2013.01); *G05B 2219/21157* (2013.01); *H02J 7/0047* (2013.01)
USPC ........................................................ 320/106

(58) Field of Classification Search
USPC ........................................................ 320/106
See application file for complete search history.

(56) References Cited

U.S. PATENT DOCUMENTS

| 5,941,846 | A | 8/1999 | Duffy et al. | |
| 5,945,803 | A * | 8/1999 | Brotto et al. | 320/106 |
| 6,194,869 | B1 | 2/2001 | Peterzell | |
| 6,420,854 | B1 * | 7/2002 | Hughes et al. | 320/165 |
| 6,870,475 | B2 | 3/2005 | Fitch et al. | |
| 7,439,706 | B2 * | 10/2008 | Brenner | 320/106 |
| 8,212,530 | B2 * | 7/2012 | Shen et al. | 320/150 |
| 8,604,748 | B2 * | 12/2013 | Littow | 320/106 |
| 2005/0248309 | A1 * | 11/2005 | Denning | 320/106 |
| 2008/0157714 | A1 * | 7/2008 | LeMay et al. | 320/107 |
| 2009/0128165 | A1 | 5/2009 | Nie et al. | |

FOREIGN PATENT DOCUMENTS

| DE | 102005046569 A1 | 4/2007 |
| EP | 1594024 A1 | 11/2005 |
| WO | 2004036774 A2 | 4/2004 |

* cited by examiner

*Primary Examiner* — Edward Tso
*Assistant Examiner* — Ramy Ramadan

(57) ABSTRACT

A supply unit (10) supplies an electrically operated device (12) with electrical power and/or an electrical signal by connector elements (22, 24, 26, 28) for a releasable contacting of a dedicated connector (30,32) of the electrically operated device (12). The supply unit (10) includes a measuring device (34) for measuring a parameter, which parameter is suitable for determining the presence of an external capacitance electrically interconnected between one connector element (22) and another connector element (24) the supply unit (10) from said parameter.

19 Claims, 2 Drawing Sheets

SUPPLY UNIT AND A METHOD FOR SUPPLYING AN ELECTRICALLY OPERATED DEVICE

FIELD OF THE INVENTION

The present invention relates to a supply unit and a method for supplying an electrically operated device with electrical power and/or an electrical signal by means of connector elements for a releasable contacting of dedicated connector means of the electrically operated device, an according electrically operated device and an electrical system comprising an electrically operated device and a supply unit.

BACKGROUND OF THE INVENTION

The electrical system is for example a medical patient monitoring system, said system comprising the electrically operated device, which is for example a battery operated portable physiological monitoring device. The supply unit for supplying the electrically operated device with electrical power and/or an electrical signal by means of connector elements for a releasable contacting of dedicated connector means of the electrically operated device is for example a charging station for recharging the battery of the monitoring device.

Physiological monitoring devices are devices for measurement and visualization of more than one physiological parameter of human beings. These monitoring devices in general consist of multiple sensor elements for measuring various physiological signals. In most cases the sensors are detachable and have connector means for power and signal transmission, as well as for communication and identification purposes.

In a medical environment cleaning and disinfection is an essential requirement with increasing importance. Patient leakage and auxiliary currents of the patient monitoring system are limited by legal requirements. Numerous mechanical constructions exist to fulfill the requirements needed for patient safety in case of accidental contact with connector means and/or connector elements being electrical conductive connectors (female) and/or connector pins (male). Because of their design inherent holes, cavities, splices, vents etc., connector means based on the principle of male and female connectors are always difficult to clean and disinfect.

Therefore, it is not allowable to constantly apply power to electrically conductible contacts like the connector elements and/or connector means while patients or bystanders might touch these contacts, for example when the connector element for an applied part is not in use. Normally this requirement is solved by using connector elements and/or connector means, which ensure protection against accidental contact by an appropriate mechanical construction. A so-called 'test finger' is used for verification of the protection efficiency.

Safeguards, based on mechanical construction principles, always have one major disadvantage in a medical environment: they inherently do not comply with the needs for disinfection, cleaning and protection against liquid ingress. Medical devices which are easy and efficiently to disinfect typically have a smooth surface without any holes, cavities, splices, vents etc. There are means for completely contactless power transmission and communication, which allow completely sealed housings, but these methods have under certain conditions disadvantages. These disadvantages, especially for applied parts with high power consumption, necessitate electrical contacts.

With the increasing demand for wireless medical sensors the necessity arises for connectors which allow: (a) watertight housing constructions; (b) a smooth housing surface without holes and cavities; (c) low insertion forces; (d) transmission of relatively high battery charging currents; and (e) zero emission of electro magnetic fields.

SUMMARY OF THE INVENTION

It is an object of the present invention to provide a supply unit, an electrically operated device, an electrical system and a method for supplying an electrically operated device with electrical power and/or an electrical signal by means of connector elements.

The supply unit comprises a measuring device for measuring a parameter, which parameter is suitable for determining the presence of an external capacitance electrically interconnected between one element and another element of the connector elements of the supply unit from said parameter. This external capacitance preferably is the pre-determined characteristic capacitance of the electrically operated device.

With such an arrangement of connector elements and corresponding connector means at least one connector element is required to detect if the remaining connector elements are covered and protected against unintended access by an applied part or not.

The supply of the electrically operated device with electrical power and/or the electrical signal is a supply in dependence of the parameter, which parameter is suitable for determining the presence of an external capacitance electrically interconnected between one connector element and another connector element of the connector elements.

With the supply unit according to the invention it is possible to determine a specific type of electrically operated device and/or an individual electrically operated device by the characteristic capacitance of the electrically operated device, which characteristic capacitance is characteristic for said type and/or said individual electrically operated device.

The different types of electrically operated devices and/or the individual electrically operated devices on their own have characteristic capacitances in different individual capacitance ranges, e.g. in a total capacitance range from 100 nF to 700 nF seven individual capacitance ranges, each having a width of 100 nF. For example each measured capacitance within a first individual capacitance range e. g. from 100 nF ... 200 nF will be assigned to a type of electrically operated device and/or an individual electrically operated device.

According to a first embodiment of the invention, the parameter is a time dependent current and/or a time dependent voltage and/or a time constant based on said time dependent current and/or voltage. The measured parameter especially is a parameter in response to a pulse generated by the pulse-generating device. The pulse preferably is a square pulse. With the parameter being a reply parameter, the reply parameter is a reply voltage and/or a reply current.

According to another embodiment of the invention, the supply unit further comprises a pulse generating device and a controller unit for controlling the pulse generating device and the measuring device. The parameter is a reply parameter measurable as a reply to the pulse sent to the connector elements.

According to another embodiment of the invention, the supply unit further comprises an identification device for identifying an electrical connection of the supply unit with the electrically operated device by analysing the measured parameter.

According to yet another embodiment of the invention, the supply unit comprises a safeguard device for electrically isolating at least one of the connector elements and/or shorting at least one of the connector elements with ground. In the case of uncovered connector elements the safeguard device makes sure, that all connector elements with potentially hazardous voltage are on zero-potential or floating.

Preferably, the supply unit is a charging station for recharging a battery of the electrically operated device being a battery-operated device.

The present invention further relates to an electrically operated device for co-operation with the aforementioned supply unit. The electrically operated device comprises connector means, wherein said electrically operated device having a characteristic capacitance measurable between two of the connector means dedicated to one and another connector element of the supply unit.

In a preferred embodiment of the invention, the electrically operated device is a physiological monitoring device. In a medical environment cleaning and disinfection is an essential requirement with increasing importance. Patient leakage and auxiliary currents of the patient monitoring system are limited by legal requirements.

According to another embodiment of the invention, the electrically operated device is a battery operated device.

The present invention further relates to an electrical system comprising the aforementioned supply unit and the aforementioned electrically operated device. According to a preferred embodiment of the invention, the electrical system is a medical environment.

The present invention further relates to a method for supplying an electrically operated device with electrical power and/or an electrical signal by means of connector elements for a releasable contacting of dedicated connector means of the electrically operated device. The electrically operated device is supplied in dependence of a measuring a parameter, which parameter is suitable for determining the presence of an external capacitance electrically interconnected between one connector element and another connector element of the connector elements.

According to a preferred embodiment of the present invention, the parameter is a time dependent current and/or a time dependent voltage and/or a time constant based on said time dependent current and/or voltage.

Especially the connector elements are connector elements of a supply unit for supplying the electrically operated device with the electrical power and/or the electrical signal.

The aforementioned components, as well as the claimed components and the components to be used in accordance with the invention in the described embodiments, are not subject to any special exceptions with respect to their size, shape, material selection and technical concept such that the selection criteria known in the pertinent field can be applied without limitations.

Additional details, features, characteristics and advantages of the object of the invention are disclosed in the subclaims, the figures and the following description of the respective figure and examples, which—in an exemplary fashion—show one embodiment according to the invention.

DETAILED DESCRIPTION OF EMBODIMENTS

Figure 1:
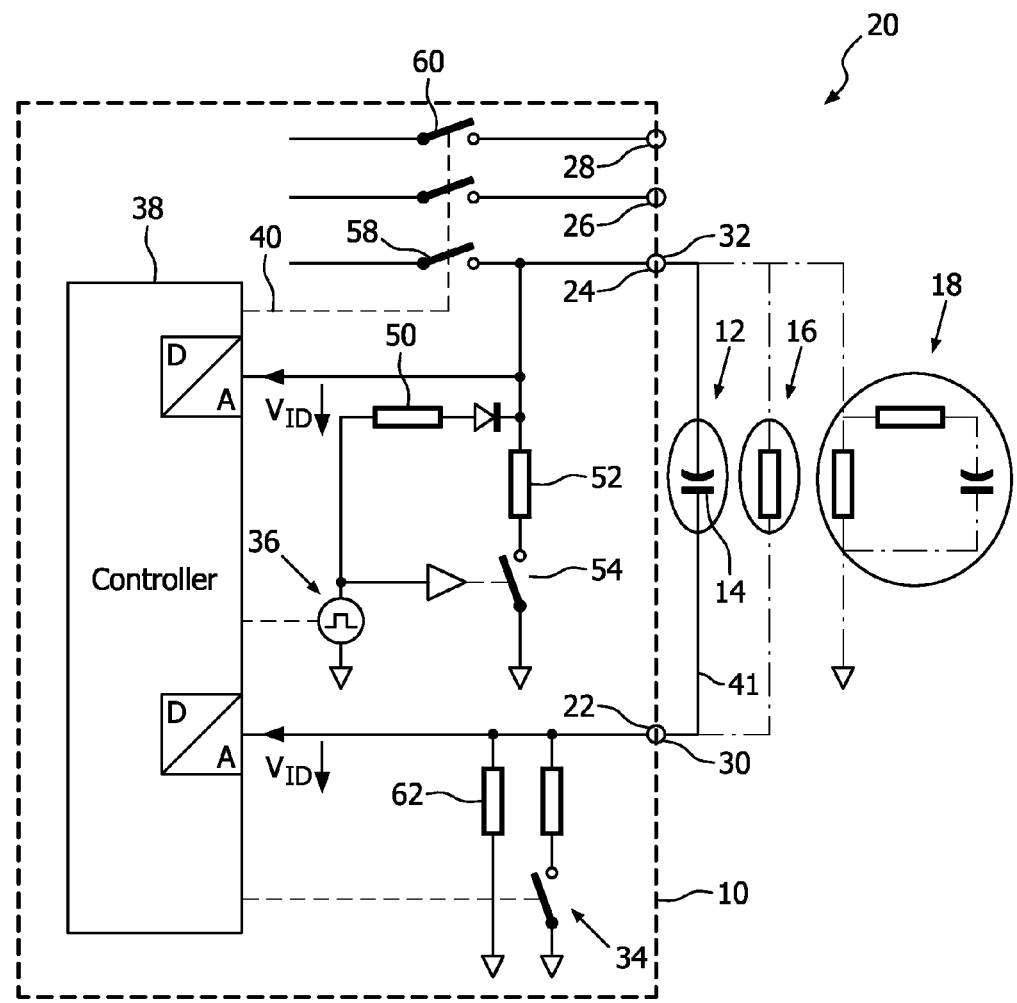
FIG. 1 is a circuit diagram of a measuring device of a supply unit for supplying an electrically operated device according to a preferred embodiment of the invention.

FIG. 1 shows on the left side a supply unit 10 for supplying an electrically operated device 12 with electrical power and/or an electrical signal and on the right side three different items possibly interacting with the supply unit: the associated electrically operated device 12 having a pre-determined characteristic capacitance (depicted as a capacitor 14) measurable between two of the connector means 30, 32, a resistive path 16 (especially a resistive path through a portion of a human being) and a so-called test-forger 18 (especially according to the international standard IEC 60601).

The supply unit 10 and the electrically operated device 12 are parts of a common electrical system 20. The electrically operated device 12 preferably is a physiological monitoring device or sensor, preferably a battery operated device, and the supply unit 10 is preferably a charging station for recharging the battery of the battery operated device.

The supply unit 10 supplies the electrically operated device 12 with electrical power and/or an electrical signal by means of connector elements 22, 24, 26, 28 for a releasable contacting of dedicated connector means 30, 32 of the electrically operated device 12. The supply unit 10 further comprises a measuring device 34 for measuring a parameter, which parameter is suitable for determining the presence of an external capacitance electrically interconnected between one element 22 and another element 24 of the connector elements 22, ..., 28 of the supply unit 10 from said parameter.

The supply unit 10 further comprises a pulse generating device 36 and a controller unit 38 for controlling the pulse generating device 36 and the measuring device 34. Especially the measuring device 34 is realized within the controller unit 38 of the supply unit 10. The supply unit 10 further comprises an identification device (realized by the controller 38) for identifying an electrical connection of the supply unit 10 with the electrically operated device 12 by analysing the measured parameter and a safeguard device 40 for electrically isolating at least one of the connector elements 26, 28 and/or shorting at least one of the connector elements 26, 28 with ground.

The electrically operated device 12 comprises an identification capacitor 14 with a pre-defined fixed value electrically arranged in a current path 41 between the two connector means 30, 32.

Basically the detection mechanism is based on the positive identification of an identification (ID) capacitor 14 with a predefined fixed value located inside of the (or each) electrically operated device 12. To achieve reliable detection, it is necessary to be able to securely distinguish the state of a presence of the electrically operated device 12 from the other states. The system can have the following states:

1) Valid electrically operated device 12 present: power may be applied as long as the power is not disabled by the controller unit 38 for other reasons;
2) No valid electrically operated device 12 present: power off, control lines disabled;
3) Resistive path 16 between the one and the other connector element 22, 24: both connector elements 22, 24 are simultaneously touched by patient/nurse or connector elements 22, 24 are soiled with conductive matter like water/saline solutions or cleaning agents: power off, control lines disabled 4) Resistive path between high charging contact and protective earth because patient or nurse touches (only) this connector element 22, 24 or because the connector element 22, 24 and a housing of the supply unit 10 is soiled: power off, control lines disabled (Note that state 3 and 4 may take place at the same time as state 1 or state 2, where the latter case must not lead to a false positive decision for state 1.)

Figure 2:
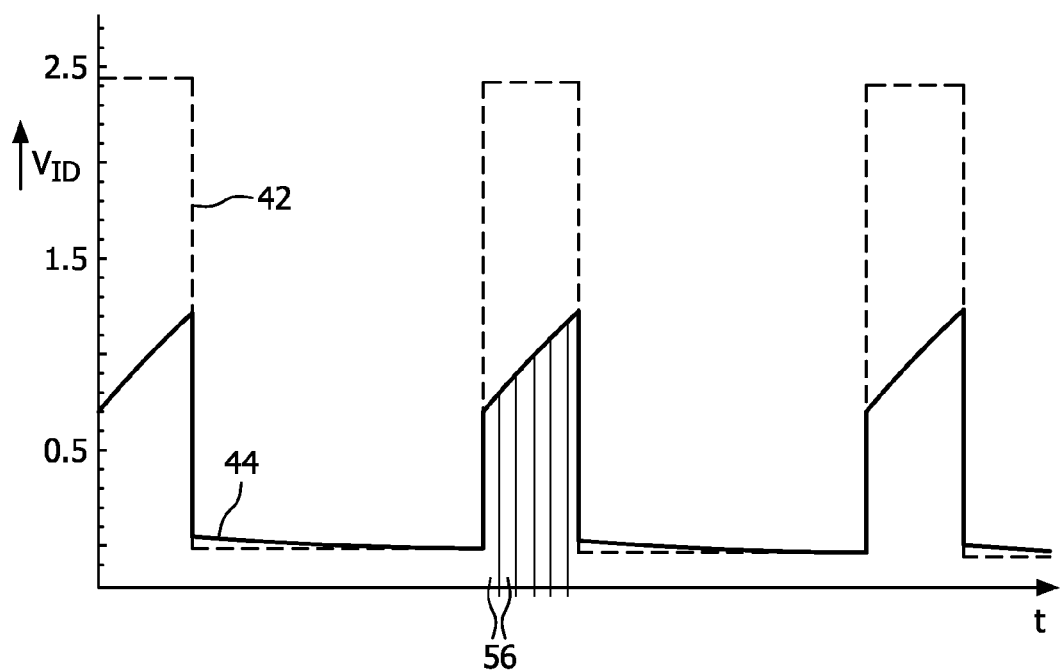
FIG. 2 shows a diagram of a voltage square-pulse and the responding capacitor voltage vs. time.

FIG. 2 shows a diagram of a voltage square-pulse 42 generated by the pulse generating device 36 and the responding capacitance reply voltage 44 of the electrically operated device 12 measurable by the measuring device 34, both signals 42, 44 plotted against the time t.

Figure 3:
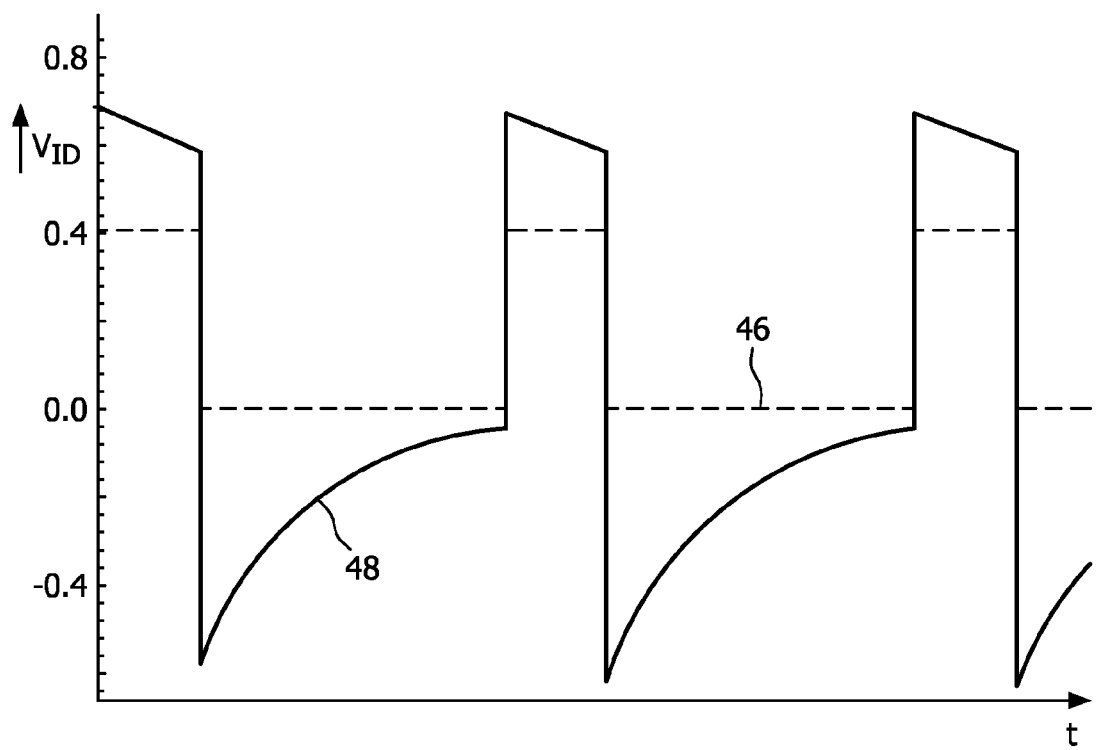
FIG. 3 shows a diagram of the corresponding current square-pulse and the responding capacitor current vs. time.

FIG. 3 shows a diagram of a corresponding current square-pulse 46 generated by the pulse generating device 36 and a responding capacitance reply current 48 of the electrically operated device 12 measurable by the measuring device 34, both signals 46, 48 plotted against the time t.

During detection, the electrically operated device 12 will be excited periodically with a square wave signal 42, 46 generated by the pulse generating device 36 as shown in FIG. 2. The excitation signal has an asymmetric duty cycle as shown in FIGS. 2 and 3. During the short cycle the capacitance or ID capacitor 14 is charged over a high series impedance 50 of the pulse generating device, whereas the longer discharge time (using a low-impedance discharge path 52, 54) will prevent build-up of an offset voltage across the identification capacitor 14.

If an electrically operated device 12 is present, the reply voltage 44 at the driven one connector element 22 (power contact) will rise approximately linear and the reply current flow 48 will remain more or less constant during excitation of the electrically operated device 12. Multiple current and voltage measurements will be taken during each excitation pulse and must lie within a certain range to be considered the result of a genuine ID capacitor 14, and thus, a connected electrically operated device 12.

In order to achieve a very reliable and secure detection, the current flowing back through the other connector element 24 (low contact) as well as the voltage at the one connector element 22 (high contact) are measured. Only if all of several conditions imposed on the reply current 48 and reply voltage 44 waveforms are satisfied for several consecutive excitation pulse cycles an electrically operated device 12 is declared recognized.

After an electrically operated device 12 has been detected, a power line 58 and other control lines 60 are switched on until the monitored reply voltage 44 or reply current 48 are not in their specified limits. Shortly after the rising edge of the excitation pulse, reply current 48 is measured with high resolution in the return path by means of a current sensing shunt 62 with high impedance. If the measured current is not within a predefined range, this will be regarded as an empty slot.

If no electrically operated device 12 is present or if there is a resistive path 16 between the one and other connector element (contacts) 22, 24 and/or protective earth, voltage and/or current measurements (reply voltage 44, reply current 48) will deviate from these expected measurement waveforms. This will be considered as absent of an electrically operated device 12. After power is applied, this detection mechanism is not working anymore. Therefore, current monitoring of the reply current 48 is used to detect a removal of the electrically operated device 12. The electrically operated device 12 will be regarded as removed as soon as the current of the current pulse 46 and/or the reply current 48 falls below a preset minimum threshold.

To increase safety, additional hardware at each of the power switches ensures that charge power is only switched on as long as the related control signal from the microcontroller is toggling continuously. Charge power is switched off (and remains switched off) if the control signal is static high or static low to avoid that power is inadvertently switched on if the microcontroller hangs in either state.

In a medical environment cleaning and disinfection is an essential requirement with increasing importance. Patient leakage and auxiliary currents of the patient monitoring system are limited by legal requirements.

The proposed detection method has the following advantages:
It allows detection and classification without additional sensing methods or additional pins;
can be used in conjunction with power lines e.g. for battery charging;
fulfills medical requirements for patient leakage and auxiliary currents;
adds only minimal extra hardware to the sensor and
is lightweight and robust.

Especially for electrically operated devices 12 being wireless medical devices which can be docked for battery charging in a supply unit 10 formed as a charging station the proposed method provides the chance to have enclosure designs which are totally smooth and watertight, without any additional sensing method or detection pins. A totally smooth device enclosure allows easy disinfection and cleaning. In case of uncovered contact pins in e.g. caused by sensor removal, all touchable pins fulfill the legal leakage and auxiliary current requirements.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A supply unit for supplying an electrically operated device with electrical power and/or an electrical signal by connector elements for releasably contacting dedicated connectors of the electrically operated device, the supply unit comprising:
a measuring device for measuring parameters, which parameters are suitable for determining the presence of an external capacitance electrically interconnected between one connector element and another connector element of the connector elements of the supply unit,
a pulse generator configured to output a series of temporally spaced apart pulses to the connector elements, the output pulses having a characteristic output shape, wherein in response to application of the output pulses across the external capacitance of the electrically operated device, transforms the output pulses into reply pulses of a characteristic reply shape,
wherein the measuring device determines whether the reply pulses are of the characteristic reply pulses,
wherein power is supplied in response to a plurality of reply pulses of the characteristic reply shape, and
wherein the parameters include a time dependent current and a time dependent voltage.

2. The supply unit according to claim 1, wherein the parameters further include a time constant based on said time dependent current and/or voltage.

3. The supply unit according to claim 1, further comprising:
a controller for controlling the pulse generating device, wherein the controller is configured to receive a reply pulse from the electrically operated device responsive to the pulse generating device and to cease supplying electrical power when the reply pulse falls below a preset minimum threshold.

4. The supply unit according to claim 1, further comprising:
an identification device for identifying an electrical connection of the supply unit with the electrically operated device by analyzing the measured parameters.

5. The supply unit according to claim 1, comprising:
a safeguard device for electrically isolating at least one of the connector elements and/or shorting at least one of the connector elements with ground.

6. The supply unit according to claim 1, wherein the supply unit is a charging station for recharging a battery of the electrically operated device being a battery operated device.

7. An electrically operated device for co-operation with the supply unit according to claim 1, wherein said electrically operated device has a pre-determined characteristic capacitance measurable between two of the dedicated connectors, the dedicated connectors being electrically connectable to one connector element and another connector element of the supply unit.

8. The device according to claim 7, wherein the electrically operated device is a physiological monitoring device.

9. The device according to claim 7, wherein the electrically operated device is a battery operated device.

10. The device according to claim 7, comprising:
an identification capacitor with a pre-defined fixed value electrically arranged in a current path between the two dedicated connectors.

11. A method for supplying an electrically operated device with electrical power and/or an electrical signal, comprising:
measuring a parameter between one connector element and another connector element of a plurality of connector elements of a charging station for a releasable contacting of dedicated connectors of the electrically operated device;
determining the presence of an external capacitance electrically interconnected between the one connector element and the another connector element of the connector elements of the charging station in accordance with the measured parameter;
determining the presence of at least one resistive path between the one connector element and at least one additional connector element;
charging a battery of the electrically operated device in accordance with an external capacitance determination and a negative resistive path determination; and
withholding electrical power from the electrically operated device in accordance with an at least one positive resistive path determination.

12. The method according to claim 11, wherein the parameter is a time dependent current and/or a time dependent voltage and/or a time constant based on said time dependent current and/or voltage.

13. The method according to claim 12, further comprising:
periodically exciting the electrically operated device with a pulse from the charging station;
receiving a reply from the electrically operated device responsive to the pulse from the charging station, the reply corresponding to a reply current or a reply voltage; and
ceasing charging the electrically operated device with electrical power when the reply falls below a preset minimum threshold.

14. The method according to claim 13, wherein the pulse has an asymmetric duty cycle.

15. The method according to claim 13, wherein ceasing charging further comprises at least one of electrically isolating at least one of the connector elements or shorting at least one of the connector elements with ground.

16. A charging station for supplying an electrically operated device with electrical power and/or an electrical signal, comprising:
a plurality of connector elements configured to releasably contact corresponding connectors of the electrically operated device;
a controller configured to:
measure a capacitance electrically interconnected between one of the connector elements and another of the connector elements and a resistance between the one connector element and the another connector element,
supply electrical power to the electrically operated device in response to the measured capacitance matching a preselected capacitance and the measured resistance being below a preselected resistance corresponding to a resistance attributable to contamination or a human finger across the one and another connector elements, and
withholding electrical power in response to the measured resistance corresponding to one of the resistance of the contamination and the resistance of the human finger.

17. The charging station according to claim 16, further comprising:
a pulse generator controlled by the controller to apply electrical pulses across the one and another connector elements, wherein the controller unit is configured to receive a reply pulse from the electrically operated device responsive to the pulses from the pulse generator and to cease supplying electrical power when the reply pulse falls below a preset minimum threshold.

18. The charging station according to claim 16, wherein the controller unit is configured to determine a specific type of the electrically operated device based on the determined external capacitance, and wherein the measured parameters are a time dependent current and a time dependent voltage.

19. The supply unit according to claim 1, wherein the measuring device further measures parameters, which parameters are suitable for determining the presence of a resistance between the one connector element and the another connector element,
wherein electrical power is supplied to the electrically operated device in response to the determined resistance being below a preselected resistance corresponding to a resistance attributable to contamination or a human finger across the one and another connector elements, and
wherein electrical power is withheld in response to the determined resistance corresponding to one of the resistance of the contamination and the resistance of the human finger.

* * * * *